United States Patent [19]

Chambers

[11] 4,029,329
[45] June 14, 1977

[54] CHILD'S THREE-WHEEL SCOOTER

[76] Inventor: Carter Carl Chambers, P.O. Box 576, Parker, Ariz. 85344

[22] Filed: Jan. 19, 1976

[21] Appl. No.: 650,407

[52] U.S. Cl. .................... 280/87.02 R; 280/89; 280/272

[51] Int. Cl.² ........................................ B62K 5/04

[58] Field of Search ............ 280/87.02 R, 87.01, 280/87.04 R, 87.05, 272, 16, 79.2, 263, 271, 89; D34/15 AT; 2/24

[56] References Cited

UNITED STATES PATENTS

| 1,470,441 | 10/1923 | Green | 280/87.05 |
|---|---|---|---|
| 1,666,827 | 4/1928 | McFarlan | 280/87.02 |
| 1,685,614 | 9/1928 | Peacock | 280/87.05 |
| 2,484,494 | 10/1949 | Ferguson | 280/87.02 R |
| 2,592,397 | 4/1952 | Dubbs | 280/16 |

FOREIGN PATENTS OR APPLICATIONS

| 370,923 | 5/1939 | Italy | 280/16 |
|---|---|---|---|

Primary Examiner—Joseph F. Peters, Jr.
Assistant Examiner—John A. Pekar
Attorney, Agent, or Firm—Charles E. Cates

[57] ABSTRACT

A child's three-wheel scooter having a support bar, a front wheel and two rear wheels, a knee trough supported by said support bar, a vertically disposed steering column for steering the front wheel, projections extending from the vertically disposed steering column adapted to engage the support bar when the wheel is turned approximately 45° in either direction, and a strap to restrain the knee in the trough without blocking drainage of accumulated water.

3 Claims, 4 Drawing Figures

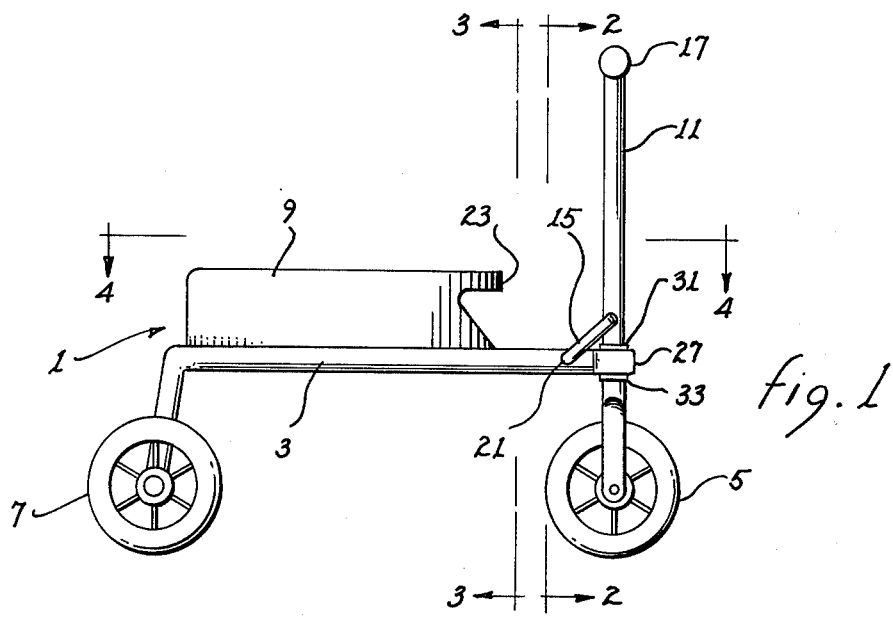
fig. 1
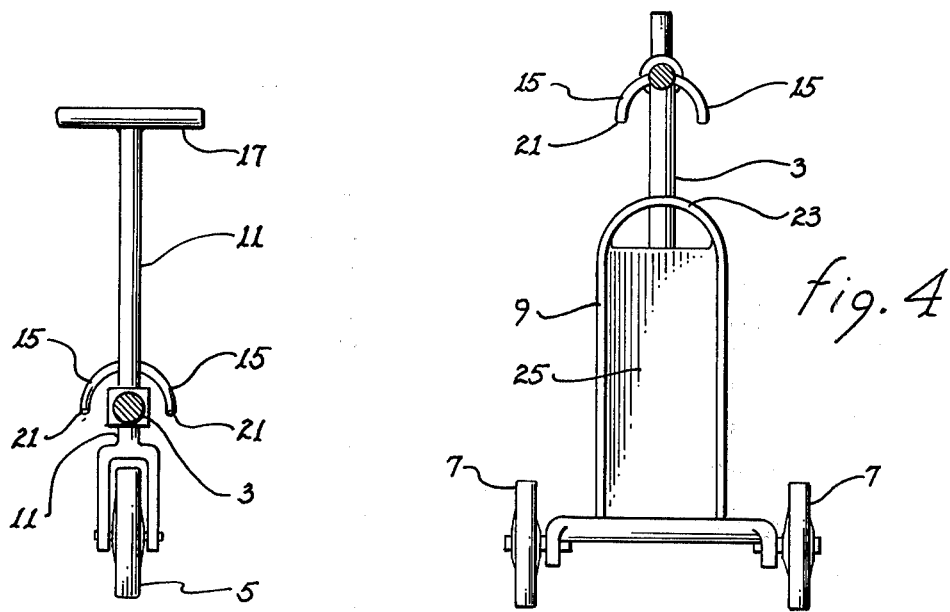
fig. 2
fig. 4
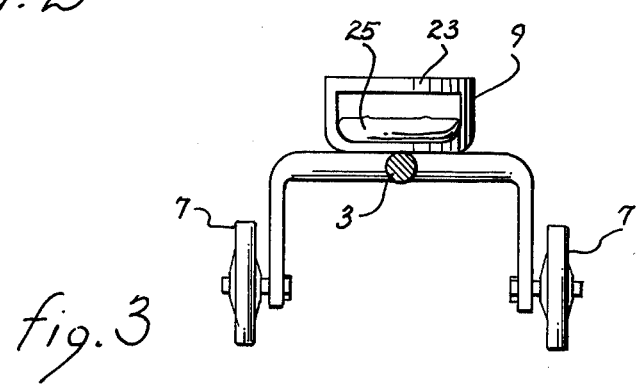
fig. 3

CHILD'S THREE-WHEEL SCOOTER

BACKGROUND OF THE INVENTION

This invention relates to children's three wheel knee scooters.

Known to the prior art are three wheeled knee scooters, a sampling of which can be seen in U.S. Pat. to Prochaska, Nos. 1,615,403; Avril, 1,668,623; and Rich, 3,059,943. Typically they have a support bar from which fore and aft wheels depend, a knee trough supported by the support bar and a steering column at the front.

Three wheeled knee scooters are preferable to the two wheeled type because of the added stability which three wheels impart. One type is as shown in Prochaska where the two wheels are in the rear. However, young children are not adept at steering such vehicles and are prone to attempt to turn too sharply resulting in a flip-over in the direction of the turn due to the child's momentum and the lack of proper support in that direction when the wheel is turned sharply. I have discovered that by placing two projections on either side of the steering post disposed to engage the support bar which runs horizontally to the ground that the wheel can be restrained from turning excessively and falls can thereby be averted. Ideally the wheel should be restrained at an angle of about 45° from the straight ahead position.

An ideal knee trough should be covered at the bottom with a soft, yielding material on which to rest the knee; also the forward end of the knee trough should be enclosed to permit the pressure of the child's knee to bear against the vehicle; otherwise, the child's knee tends to slip forward of the knee trough and the full thrust of the knee is not translated into the work of propelling the vehicle forward. However, this raises another problem. Inasmuch as these vehicles are quite often left outside in the yard by the child owner on flat or sloping ground the enclosed trough tends to form a pond in which dew and rain water collect. This contributes to the rust of the metal and/or the rotting of the fabric which covers the bottom of the trough. I have discovered that by enclosing only the top portion of the trough with a loop or band of metal or material that the accumulated water can be drained out of the trough no matter how the scooter is parked.

A fuller understanding of the invention can be obtained from consideration of the drawings, in which:

FIG. 1 is a side elevation of the scooter showing a preferred embodiment;

FIG. 2 is a sectional view of the scooter of FIG. 1 along the lines 2—2;

FIG. 3 is a sectional view of the scooter of FIG. 1 along the lines 3—3;

FIG. 4 is a planed view of the device of FIG. 1, partly in section, along the lines 4—4.

DESCRIPTION OF THE PREFERRED EMBODIMENT

The scooter indicated generally as 1 has a support bar 3, one front wheel 5, two rear wheels 7, a knee trough 9, a vertically disposed steering column 11, and two projections 15 mounted on either side of the steering column 11. When the steering wheel 17 is rotated in either direction the projections 15 contact the support bar 3 when the steering wheel has been rotated to turn the wheel 5 approximately 45° from the straight ahead position. At 45° the scooter still has stability and is not likely to turn over under the pressures of turning.

In FIGS. 2 and 4 the relationship of the projections 15 to the support bar 3 is clearly seen. In FIGS. 1 and 2 it is apparent that the projections 15 extend laterally downwardly and rearwardly from the steering bar 11 to present the ends 21 of the projections 15 to the support bar 3.

Turning now to FIG. 3 it is seen that the knee trough 9 has a non-binding knee engaging strap 23, which in this case is integral with the knee trough 9 and projects forwardly. The strap can be seen in FIG. 3 as gently curving to conform comfortably to the child's knee. In the bottom of the trough is a pad 25 upon which the knee can be rested. It is to be understood that it is very desirable that any rain water or condensation of dew be drained quickly from the trough to preserve the knee pad material and the metal of the trough.

The steering column 11 is journaled in a collar 27 and prevented from moving axially by flanges 31,33 which bracket the collar 27.

While certain modifications and departures from the preferred embodiment may suggest themselves to those skilled in the art, which will be within the scope and spirit of the invention, it is intended that all such be included within the invention which is to be covered by the scope of the appended claims.

What is claimed is:

1. A child's three-wheel scooter having a support bar, two rear wheels depending from said support bar, a knee trough mounted on said support bar, vertically disposed steering column attached to the front end of said support bar, said column having a front wheel on its lower end and two laterally and rearwardly extending projections disposed to engage the support bar when said front wheel has been turned about 45° from straight in either direction.

2. The scooter of claim 1 with the addition of a forwardly projecting non-binding strap on the forward end of said knee trough to restrain the knee, but permit drainage of accumulated water.

3. The scooter of claim 2 wherein the strap is integral with said trough.

* * * * *